US010582346B2

United States Patent
Shan et al.

(10) Patent No.: US 10,582,346 B2
(45) Date of Patent: Mar. 3, 2020

(54) COMMUNICATION SCREEN EDITING AND PREVIEWING (71) Applicant: OMNIVISION TECHNOLOGIES, INC., Santa Clara, CA (US)

(72) Inventors: Jizhang Shan, Cupertino, CA (US); Hui Pan, San Jose, CA (US); Xinhua Su, San Jose, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 901 days.

(21) Appl. No.: 14/309,407

(22) Filed: Jun. 19, 2014

(65) Prior Publication Data
US 2015/0373511 A1 Dec. 24, 2015

(51) Int. Cl.
H04W 4/12 (2009.01)
G06F 9/451 (2018.01)

(52) U.S. Cl.
CPC .............. H04W 4/12 (2013.01); G06F 9/452 (2018.02)

(58) Field of Classification Search
CPC ....................................... H04W 4/12
See application file for complete search history.

(56) References Cited

U.S. PATENT DOCUMENTS 9,152,253 B2  10/2015 Liu et al.
9,154,736 B1  10/2015 Pan et al.
2008/0254881 A1* 10/2008 Lutnick ............... G07F 17/32 463/31
2008/0276200 A1 11/2008 Bamford et al.
2010/0271288 A1* 10/2010 Srinivasan ........... G06F 3/1454 345/2.2
2012/0113149 A1  5/2012 Tanabe
2014/0192198 A1  7/2014 Tsau et al.
2014/0192199 A1  7/2014 Tan et al.

FOREIGN PATENT DOCUMENTS

CN   1791071 A    6/2006
CN   100377616 C  3/2008
CN   102436351 A  5/2012
CN   102687485 A  9/2012
(Continued)

OTHER PUBLICATIONS

TW Application No. 103136043—Taiwanese Office Action and Search Report, with English Translation, dated Oct. 12, 2015 (15 pages).
(Continued)

Primary Examiner — Hsinchun Liao
(74) Attorney, Agent, or Firm — Christensen O'Connor Johnson Kindness PLLC (57) ABSTRACT A method for communicating from a mobile platform includes arranging a plurality of regions in a communication screen on a first mobile platform. Each one of the plurality of regions in the communication screen is populated with communication data. The communication data includes at least one or more of text data, image data, and video data. The communication screen is sent from the first mobile platform to a second mobile platform. A display of the communication screen on the second mobile platform appears substantially identical to a display of the communication screen on the first mobile platform.

20 Claims, 6 Drawing Sheets (56) References Cited

FOREIGN PATENT DOCUMENTS

| | | | |
|---|---|---|---|
| CN | 102707868 | A | 10/2012 |
| CN | 103024588 | A | 4/2013 |
| CN | 103324457 | A | 9/2013 |
| CN | 103984494 | A | 8/2014 |
| TW | 200844839 | A | 11/2008 |
| WO | WO 00/57617 | A1 | 9/2000 |

OTHER PUBLICATIONS

First Chinese Office Action dated Nov. 16, 2017, for Chinese Application No. 201410816735.1, filed Dec. 24, 2014, 14 pages.
Second Chinese Office Action and Translation dated Jul. 25, 2018 for Chinese Application No. 201410816735.1, filed Dec. 24, 2014, 5 pages.
Chinese Notice of Allowance with Search Report and Machine Translation dated Jan. 21, 2019 for Chinese Application No. 201410816735.1, filed Dec. 24, 2014, 9 pages.

\* cited by examiner

COMMUNICATION SCREEN EDITING AND PREVIEWING

BACKGROUND INFORMATION

Field of the Disclosure

The present invention relates generally to communicating with mobile platforms, and more specifically to editing communications with mobile platforms.

Background

It has become common to communicate using a mobile phone. For instance, two people can communicate with one another with a voice call using their mobile phones. In addition, mobile phones also allow the two people to communicate with one another by sending text messages as well as video calls. However, when communicating with text messages using mobile phones, the message sender may not know how the message will be displayed on the receiver's device. Furthermore, the message sender cannot edit how the message will appear on the receiver's device. Although, the message sender may know the content of the message that is sent, the message sender will not know how the message content will appear on the receiver's device when it is displayed.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, examples in accordance with the teachings of the present invention are directed to a editing, previewing, and sending communication screens from a first mobile platform to a second mobile platform. The layout of the communication screens may include a plurality of user editable regions that may be populated with combinations of user entered text, images, and videos in accordance with the teachings of the present invention. In the example, the user may preview the communication screen prior to sending, and the communications screen will be appear and be displayed on the recipient's mobile platform in a substantially identical fashion as it appears on the sender's platform in accordance with the teachings of the present invention.

Figures 1A, 1B:
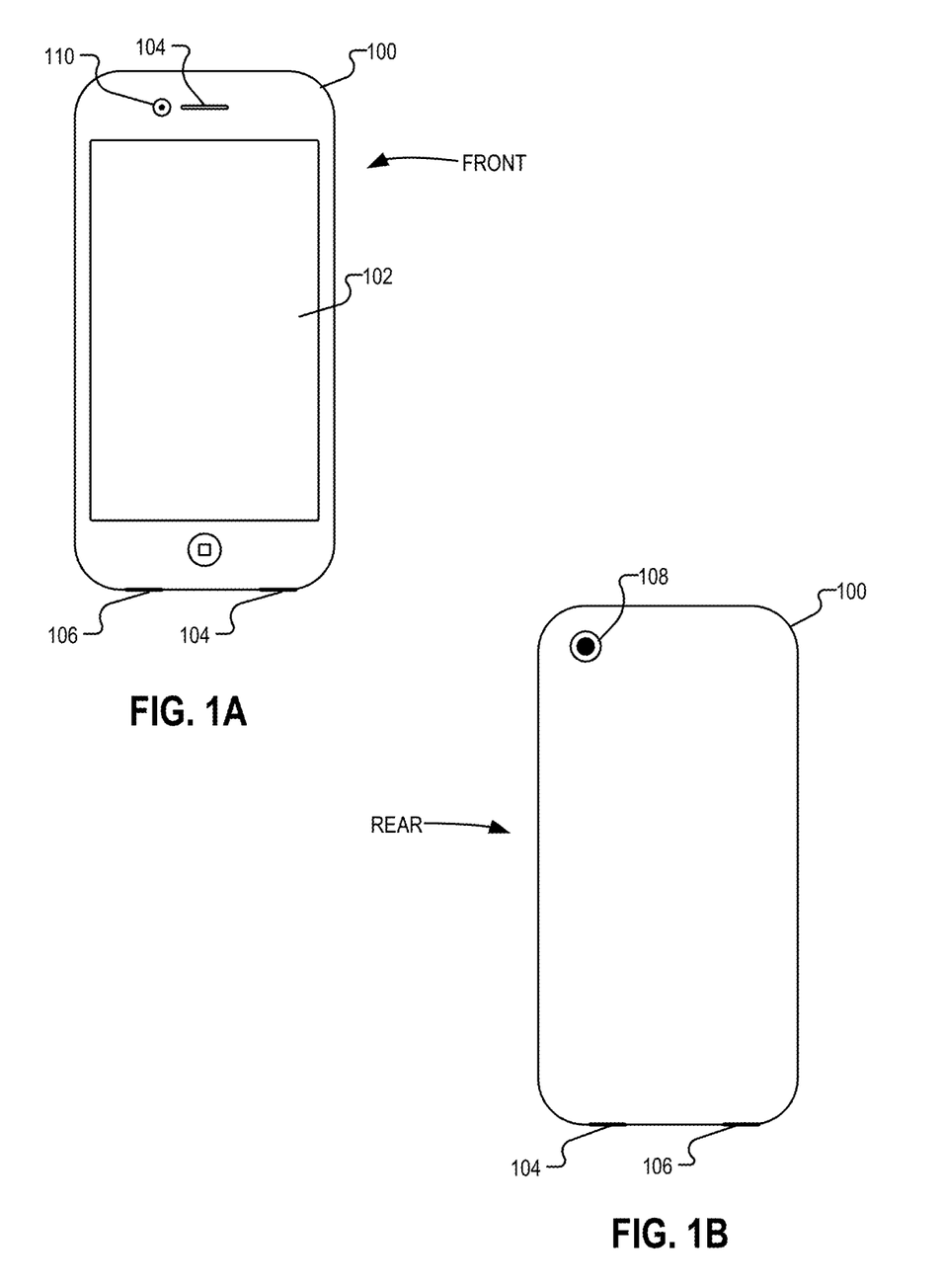
FIG. 1A is an illustration of a front side of an example mobile platform that is configured to edit, preview, send, and receive communication screens in accordance with the teachings of the present invention.
FIG. 1B is an illustration of a rear side of an example mobile platform that is configured to edit, preview, send, and receive communication screens in accordance with the teachings of the present invention.

FIG. 1A is an illustration of a front side of one example of a mobile platform 100 that is configured to edit, preview, send, and receive communication screens in accordance with the teachings of the present invention. FIG. 1B is an illustration of a rear side of the example mobile platform 100 in accordance with the teachings of the present invention. As shown in the depicted example, mobile platform 100 is illustrated as including a front-facing display 102, speakers 104, and microphone 106. In one example, mobile platform 100 further includes a rear-facing camera 108 and front-facing camera 110 for capturing images of an environment. In one example, front-facing display 102 may be a touch-screen that is adapted to function as an output display as well as receive touch inputs from a user that is operating mobile platform 100. In such an example, a virtual keyboard may be displayed on front-facing display 102 as needed as one input method to receive text input from a user. In another example (not shown), it is appreciated that mobile platform 100 may also include a physical keyboard including a plurality of physical buttons or keys to receive user input.

As used herein, a mobile platform may also refer to any mobile platform or other portable electronic device including a cellular or mobile phone or other wireless communication device, tablet computer, personal communication system (PCS) device, personal navigation device (PND), Personal Information Manager (PIM), Personal Digital Assistant (PDA), or other suitable mobile computing device that can send and receive a communication. Mobile platform 100 may be capable of receiving wireless communication signals and/or navigation signals, such as for example navigation positioning signals. The term "mobile platform" is also intended to include devices that can communicate with a personal navigation device (PND), such as by short-range wireless, infrared, wireline connection, or other connections—regardless of whether satellite signal reception, assistance data reception, and/or position-related processing occurs at the device or at the PND.

Figure 2A:
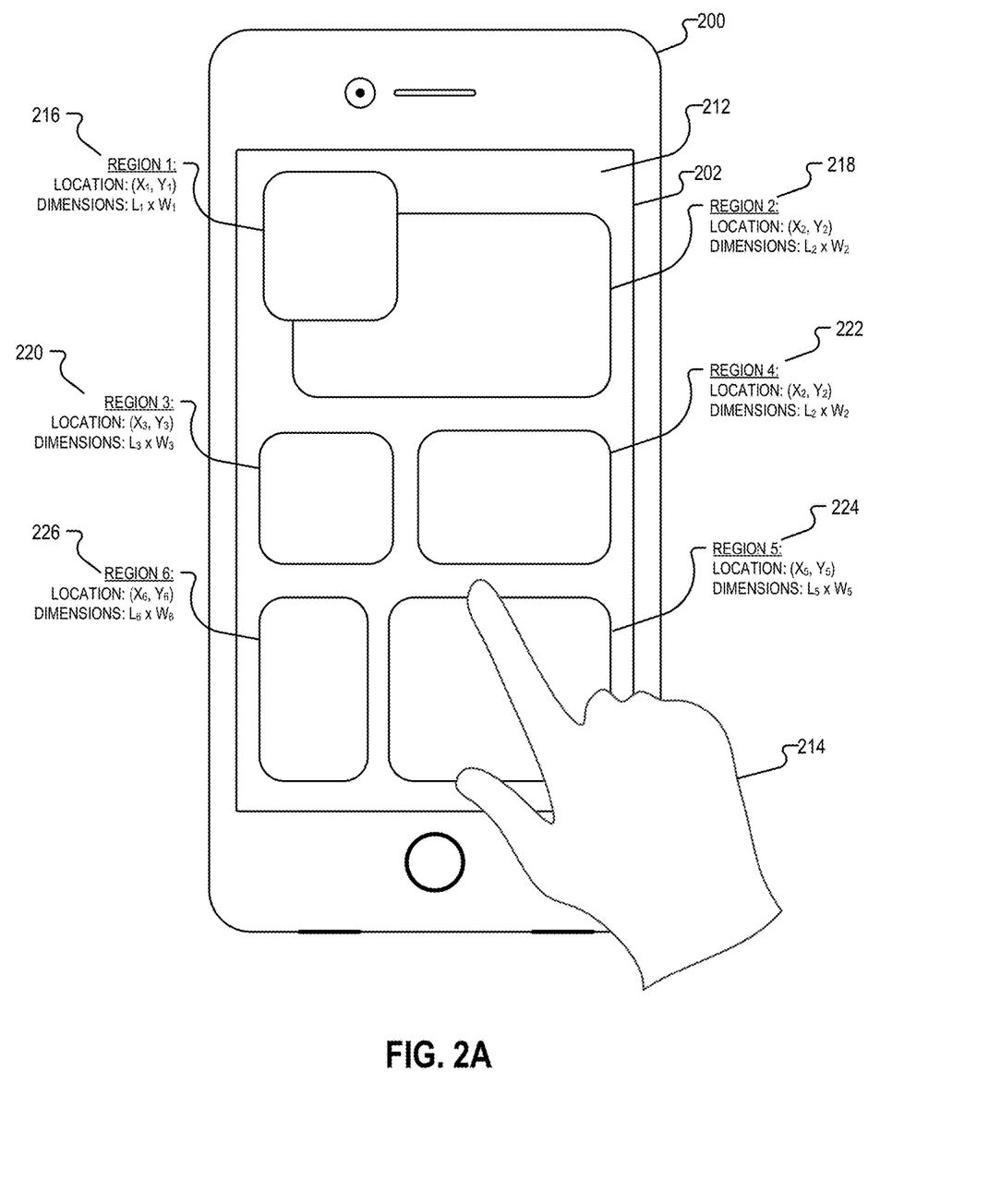
FIG. 2A is an illustration of one example of a communication screen including plurality of regions that is being edited by a user on a mobile platform in accordance with the teachings of the present invention.

FIG. 2A is an illustration of one example of a communication screen 212 that is being edited by a user on a mobile platform in accordance with the teachings of the present invention. As shown in the example, mobile platform 200 includes a display 202 on which a user 214 is editing a communication screen 212 in accordance with the teachings of the present invention. In the illustrated example, display 202 is a touchscreen on which user 214 can enter user inputs to edit communication screen 212 by touching display 202 as shown. In the example, a virtual keyboard may also be displayed on display 202 as needed as another way to receive user inputs from user 214 as needed.

In the illustrated example, user 214 may edit communication screen 212 by arranging a plurality of regions as shown. In the depicted example, the plurality of regions includes regions 216, 218, 220, 222, 224, and 226 in communication screen 212. In one example, user 214 can select the number of regions, the location of each region on the communication screen 212, as well as the dimensions (length×width) of each region as shown. For instance, in the depicted example, user 214 has selected region 216 to be at location coordinates $(X_1, Y_1)$ in communication screen 212, have a length dimension of $L_1$, and a width dimension of $W_1$. Similarly, region 218 is selected by user 214 to be at location coordinates $(X_2, Y_2)$ in communication screen 212, have a length dimension of $L_2$, and a width dimension of $W_2$, region 220 is selected by user 214 to be at location coordinates $(X_3, Y_3)$ in communication screen 212, have a length dimension of $L_3$, and a width dimension of $W_3$, region 222 is selected by user 214 to be at location coordinates $(X_4, Y_4)$ in communication screen 212, have a length dimension of $L_4$, and a width dimension of $W_4$, region 224 is selected by user 214 to be at location coordinates $(X_5, Y_5)$ in communication screen 212, have a length dimension of $L_5$, and a width dimension of $W_5$, and region 226 is selected by user 214 to be at location coordinates $(X_6, Y_6)$ in communication screen 212, have a length dimension of $L_6$, and a width dimension of $W_6$. It is appreciated that the six regions 216, 218, 220, 222, 224, and 226 that are illustrated in FIG. 2A and their respective layout are provided for explanation purposes, and that a greater or fewer number of regions having different layouts may also be included in communication screen 212 in accordance with the teachings of the present invention.

Figure 2B:
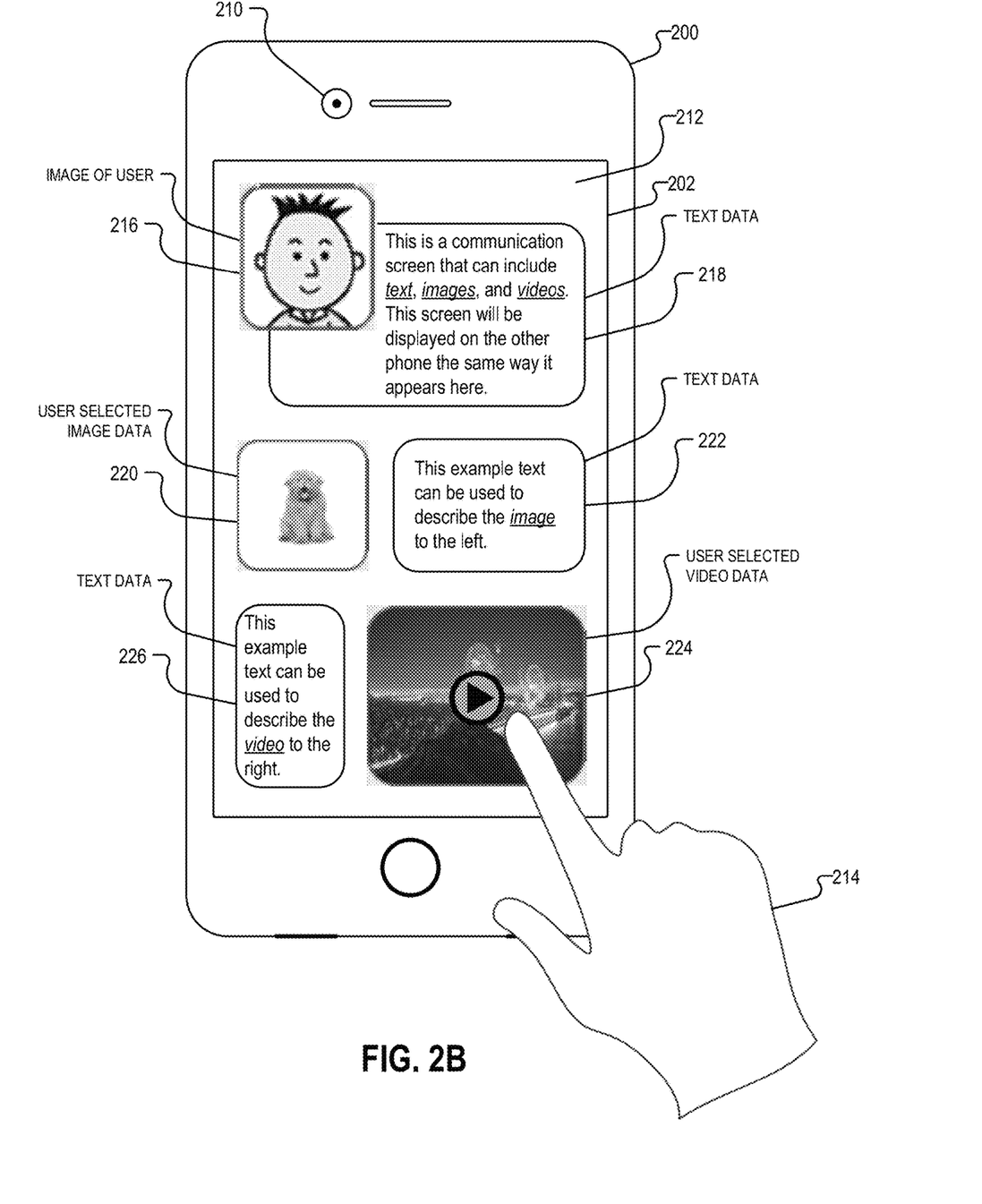
FIG. 2B is an illustration of one example of a plurality of regions in a communication screen that have been populated by a user with communication data including text data, image data, and video data on a mobile platform in accordance with the teachings of the present invention.

FIG. 2B is an illustration of the example of the plurality of regions 216, 218, 220, 222, 224, and 226 in communication screen 212 that have been populated by user 214 with communication data in accordance with the teachings of the present invention. In one example, the communication data that is used to populate the plurality of regions 216, 218, 220, 222, 224, and 226 may include a combination of one or more of text data, image data, and video data in accordance with the teachings of the present invention.

For example, as shown in the depicted example, region 216 is populated with an image representative of user 214. In one example, the image data may be a photograph, a graphic, clip art or any other suitable image data. In one example, the image data may be entered by user 214 directly from a camera included in mobile platform 200, such as for example camera 210, or from a photo library included in mobile platform 200, any other suitable source for image data. In one example, the image that is entered into region 216 may or may not have been edited, filtered, combined, merged, or otherwise processed with any image editing software or application.

In the example, region 218 is populated with text data entered by user 214. In one example, the text data may be entered by user 214 via a keyboard on mobile platform 200 or copied and pasted into region 218 from any other suitable source for text data. In one example, the text data entered in region 218 may for example be a text message from user 214 to the intended recipient of communication screen 212. In one example, the text that is entered into region 218 may include formatting to adjust, for example, the font, size, color, highlighting, boldface, underlining, italics, etc., of the text.

In the example, region 220 is populated with image data entered by user 214. In one example, the image data may be a photograph, a graphic, clip art or any other suitable image data. In one example, the image data may be entered by user 214 directly from a camera included in mobile platform 200, such as for example camera 210, or from a photo library included in mobile platform 200, or any other suitable source for image data. In one example, the image that is entered into region 220 may or may not have been edited, filtered, combined, merged, or otherwise processed with any image editing software or application.

In the example, region 222 is populated with text data entered by user 214. In one example, the text data may be entered by user 214 via a keyboard on mobile platform 200 or copied and pasted into region 222 from any other suitable source for text data. In one example, the text data entered in region 222 may for example be text information associated with or describing the image data that has been used to populate region 220 by user 214. In one example, the text that is entered into region 222 may include formatting to adjust, for example, the font, size, color, highlighting, boldface, underlining, italics, etc., of the text.

In the example, region 224 is populated with video data entered by user 214. In one example, the video data may be a video, a movie, an animation or any other suitable video data. In one example, the video data may be entered by user 214 directly from a camera included in mobile platform 200, such as for example camera 210, or from a video library included in mobile platform 200, or any other suitable source for video data. In one example, the video that is entered into region 224 may or may not have been edited, filtered, combined, merged, or otherwise processed with any video editing software or application.

In the example, region 226 is populated with text data entered by user 214. In one example, the text data may be entered by user 214 via a keyboard on mobile platform 200 or copied and pasted into region 226 from any other suitable source for text data. In one example, the text data entered in region 222 may for example be text information associated with or describing the video data that has been used to populate region 224 by user 214. In one example, the text that is entered into region 226 may include formatting to adjust, for example, the font, size, color, highlighting, boldface, underlining, italics, etc., of the text.

In the example, the user 212 can preview the communication screen 212 as shown and continue making edits to the layout of the regions and the communication data used to populate the regions until the user 214 is satisfied and is ready to send the communication screen 212 to another mobile platform. Indeed, the user can add, remove, or move regions in the communication screen 212, as well as update the communication data text, images, and video until communication screen 212 is ready to be sent.

Figure 3:
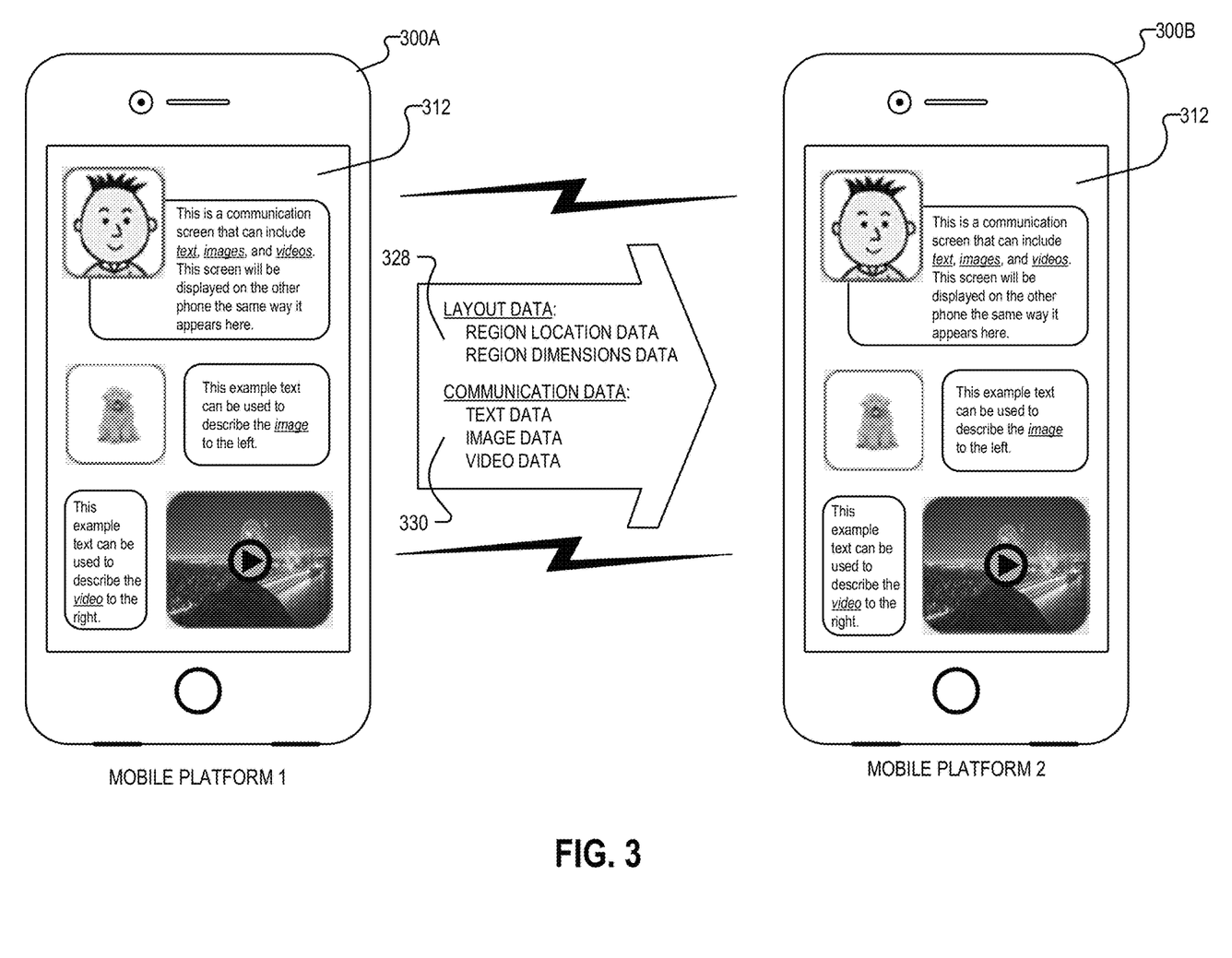
FIG. 3 is an illustration of one example of first mobile platform sending a communication screen that has been edited and previewed by the user of the first mobile platform to a second platform on which the communication screen appears the same way on the second mobile platform as it does on the first mobile platform in accordance with the teachings of the present invention.

FIG. 3 is an illustration of one example of first mobile platform sending a communication screen 312 that has been edited and previewed by the user of the first mobile platform to a second mobile platform on which the communication screen appears the same way on the second mobile platform as it does on the first mobile platform in accordance with the teachings of the present invention. For instance, FIG. 3 shows that a first mobile platform 300A has a communication screen 312 that has been edited and previewed by the user. In the example, when the user sends communication screen 312 from first mobile platform 300A to a second mobile platform 300B, the layout data 328 and the communication data 330 included in communication screen 312 are sent to mobile platform 300B in accordance with the teachings of the present invention. In the example, the layout data 328 includes region location data as well as region dimensions data, as described above for example in FIG. 2A. The communication data 330 includes text data, image data, and video data used to populate the regions included in communication screen 312, as described above for example in FIG. 2B.

As shown in the example, since mobile platform 300B receives the same layout data 328 and communication data 330 used to create communication screen 312 on mobile platform 300A, the display of communication screen 312 on second mobile platform 300B appears substantially identical to the display of communication screen 312 on first mobile platform 300A in accordance with the teachings of the present invention. In other words, what the user previewed on the first mobile platform 300A when editing communication screen 312 is what the user of mobile platform 300B will see on mobile platform 300B in accordance with the teachings of the present invention.

Figure 4:
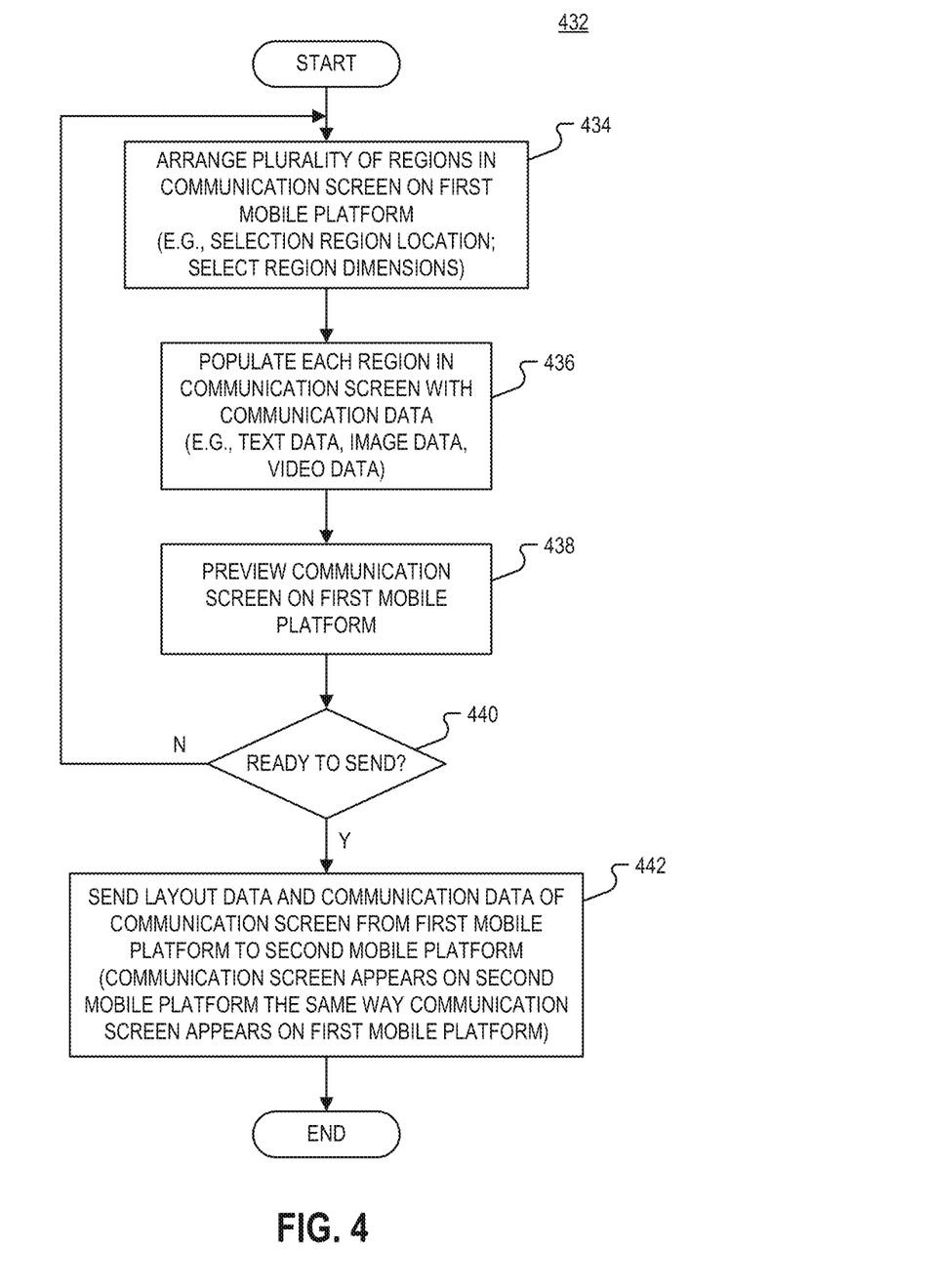
FIG. 4 is a flowchart illustrating an example process of editing, previewing and sending a communication screen from a first mobile platform to a second mobile platform in accordance with the teachings of the present invention.

FIG. 4 is a flowchart 432 illustrating an example process of editing, previewing and sending a communication screen from a first mobile platform to a second mobile platform in accordance with the teachings of the present invention. As shown in the example, process block 434 shows that a plurality of regions is arranged in a communication screen on a first mobile platform. In the example, the arrangement of the plurality of regions includes the user selecting a location for each region in the communication screen as well as selecting a size (i.e., dimensions) for each region in the communication screen.

Process block 436 shows that the user populates each region with communication data. In the example, the communication data may include a combination of one or more of text data, image data, and video data in accordance with the teachings of the present invention.

Process block 438 shows that the user can then preview the communication screen and process block 440 shows that the if the user would like to continue making additional edits to the communication screen, processing may loop back to process block 434, where the user may make additional modifications to the arrangements in the plurality of regions and make additional changes to the communication data used to populate the regions in process block 436.

When the user is ready to send the communication screen in process block 440, process block 442 shows that the layout data and the communication data of the communication screen created on the first mobile platform are sent from the first mobile platform to the second mobile platform. Since the second mobile platform receives the same layout data and communication data that are used to create the communication screen on the first mobile platform, the display of the communication screen on the second mobile platform appears substantially identical to the display of communication screen on first mobile platform in accordance with the teachings of the present invention.

Figure 5:
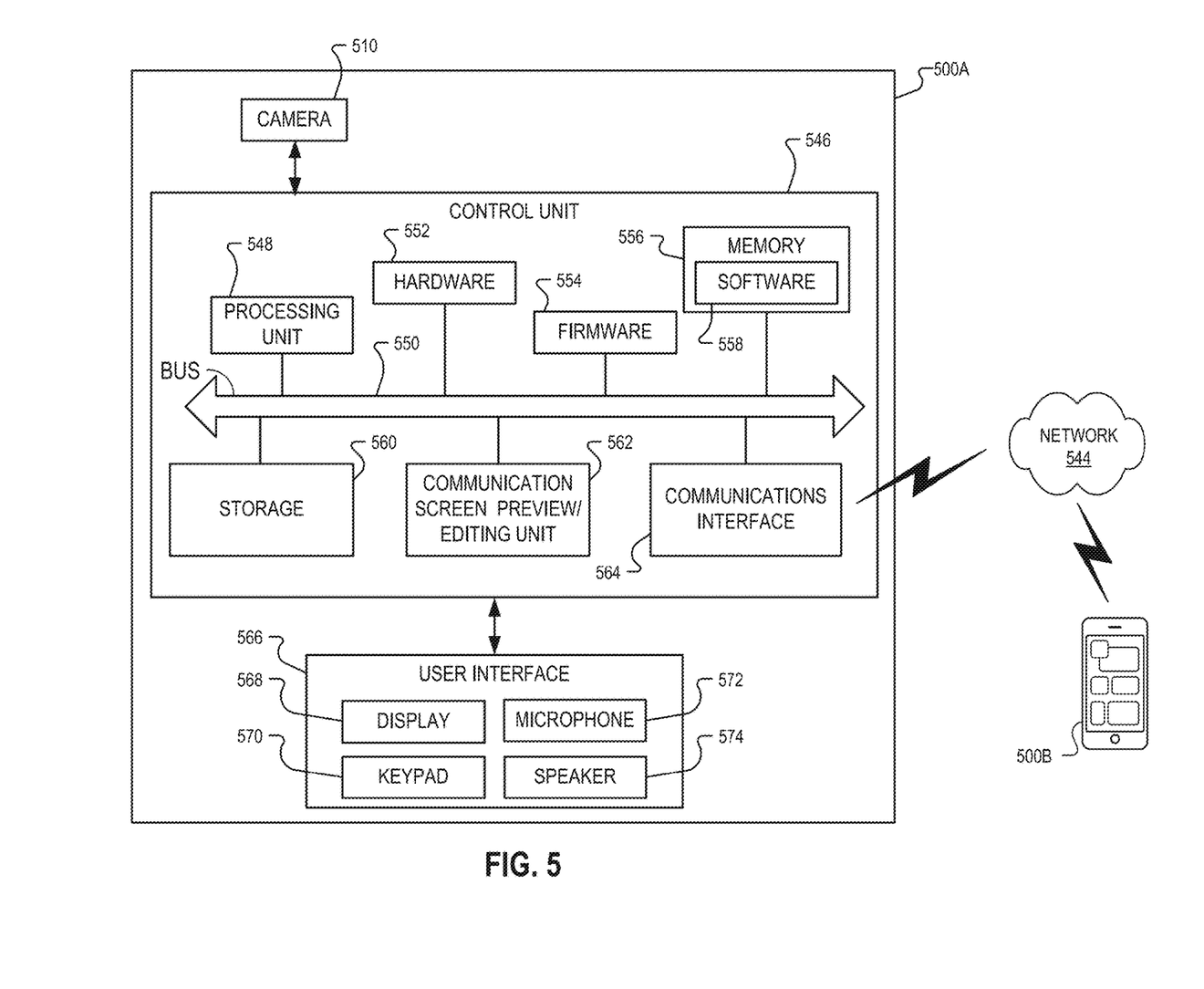
FIG. 5 is a functional block diagram illustrating a mobile platform adapted to edit, preview, and send a communication screen in accordance with the teachings of the present invention.

FIG. 5 is a functional block diagram illustrating a mobile platform 500A adapted to edit, preview, and send a communication screen in accordance with the teachings of the present invention. It is appreciated that mobile platform 500A of FIG. 5 is one possible implementation of mobile platform 100 of FIGS. 1A and 1B, or mobile platform 200 of FIGS. 2A and 2B, or mobile platform 300A of FIG. 3. As shown in the depicted example, mobile platform 500A includes a camera 510 as well as a user interface 566 that includes a display 568 capable of displaying images and videos captured by the camera 510, as well as editing and previewing a communication screen as described above. User interface 566 may also include a keypad 570 through which the user can input information into the mobile platform 500A. In one example, display 568 may be a touchscreen to receive touch inputs. In addition, in order to provide the user with multiple ways to provide user input, mobile platform 500A may include a virtual keyboard presented on the display 568 where the mobile platform 500A receives user input via the touchscreen through display 568. User interface 566 may also include a microphone 572 and speaker 574.

In one example, mobile platform 500A includes a communication screen preview/editing unit 562 that is configured to perform communication screen creation, editing, and previewing. For instance, in one example, communication screen preview/editing unit 562 is configured to perform process 432 discussed above in FIG. 4, and described in FIGS. 2A, 2B, and 3. Of course, mobile platform 500A may include other elements unrelated to the present disclosure, but have not be described in detail so as not to obscure the teachings of the present invention.

As shown in the depicted example, mobile platform 500A also includes a control unit 546 that is connected to and communicates with the camera 510 and user interface 566, along with other features, such as the communication screen preview/editing unit 562 in order to create, edit, and send the communication screen in accordance with the teachings of the present invention. Control unit 546 may be provided by a processing unit 548, and associated memory 556, hardware 552, software 558, and firmware 554 that are coupled to processing unit 548 via a bus 550. In the example depicted in FIG. 5, it is noted that communication screen preview/editing unit 562 is illustrated separately from processing unit 548 for clarity, but may be a single unit and/or implemented in the processing unit 548 based on instructions in the software 558, which is run in the processing unit 548.

In one example, storage 560 may also be coupled to processing unit 548 via bus 550. In one example, storage 560 may store data such as for example but not limited to a photo library or a video library, which may be used to provide image data and/or video data used in the communication data to populate the regions of the communication screen discussed above.

In one example, a communications interface 564 may also be coupled to processing unit 548 via bus 550. In one example, communication interface 564 may provide wireless transceiver for mobile platform 500A, which may be used to provide wireless communications including sending the communication screen from mobile platform 500A to a second mobile platform 500B through network 544 as shown.

In one example, processing unit 548 as well as communication screen preview/editing unit 562 can, but need not necessarily include, one or more microprocessors, embedded processors, controllers, application specific integrated circuits (ASICs), advanced digital signal processors (ADSPs), and the like. The term processing unit describes the functions implemented by the system rather than specific hardware. Moreover, as used herein the term "memory" refers to any type of computer storage medium, including long term, short term, or other memory associated with mobile platform 500A, and is not to be limited to any particular type of memory or number of memories, or type of media upon which memory is stored.

The processes described herein may be implemented by various means depending upon the application. For example, these processes may be implemented in hardware 552, firmware 554, software 558, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 556 and executed by the processing unit 548. Memory 556 may be implemented within or external to the processing unit 548.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The order in which some or all of the process blocks appear in each process discussed above should not be deemed limiting. Rather, one of ordinary skill in the art having the benefit of the present disclosure will understand that some of the process blocks may be executed in a variety of orders not illustrated.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Various modifications to the embodiments disclosed herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communicating from a mobile platform, comprising:

editing an editable communication screen on a first mobile platform in response to input of a user, wherein editing the editable communication screen includes:

selecting a number of first content regions to be included in the editable communication screen;

arranging the first content regions within the editable communication screen on the first mobile platform by moving each one of the first content regions to a selected coordinate location within the editable communication screen;

populating each one of the first content regions of the editable communication screen with first communication data selected by the user, wherein the first communication data includes text data, image data, and video data, wherein the image data includes an image that is combined with another image, using the first mobile platform; and     sending the editable communication screen, including layout data utilized to arrange each of the first content regions to the selected coordinate location and the first communication data utilized to populate each one of the first content regions, from the first mobile platform to a second mobile platform to create a communication screen on a display of the second mobile platform appearing substantially identical to a display of the editable communication screen on the first mobile platform such that the display of the second mobile platform includes second content regions populated with second communication data at relative coordinate locations identical to the first content regions populated with the first communication data at the selected coordinate locations of the first mobile platform.

2. The method of claim 1, wherein arranging the first content regions in the editable communication screen comprises:
selecting a length dimension and a width dimension for each one of the first content regions in the editable communication screen.

3. The method of claim 2, wherein the layout data further includes the length dimension and the width dimension for each one of the first content regions in the editable communication screen.

4. The method of claim 1, wherein populating each one of the first content regions in the editable communication screen with the first communication data includes populating a first one of the first content regions with image data representative of a user of the first mobile platform.

5. The method of claim 4, wherein the image data representative of the user of the first mobile platform is a photo of the user of the first mobile platform taken with a camera included in the first mobile platform.

6. The method of claim 1, wherein populating each one of the first content regions in the editable communication screen with the first communication data includes populating a second one of the plurality of regions with text data entered by the user of the first mobile platform.

7. The method of claim 1, wherein populating each one of the first content regions in the editable communication screen with the first communication data comprises:
populating a third one of the first content regions with user selected image data; and
populating a fourth one of the first content regions with text data associated with the user selected image data used to populate the third one of the first content regions.

8. The method of claim 7, wherein populating the third one of the first content regions with the user selected image data comprises selecting the user selected image data from a photo library of the first mobile platform, and wherein populating the fourth one of the first content regions with text data comprises populating the fourth one of the first content regions with text data entered by the user of the first mobile platform.

9. The method of claim 7, wherein the user selected image data is a photo taken with a camera included in the first mobile platform, and wherein populating the fourth one of the first content regions with text data comprises populating the fourth one of the first content regions with text data entered by the user of the first mobile platform.

10. The method of claim 1, wherein populating each one of the first content regions in the editable communication screen with the first communication data comprises:
populating a fifth one of the first content regions with user selected video data; and
populating a sixth one of the first content regions with text data associated with the user selected video data used to populate the fifth one of the first content regions.

11. The method of claim 10, wherein populating the fifth one of the first content regions with the user selected video data comprises selecting the user selected video data from a video library of the first mobile platform, and wherein populating the sixth one of the first content regions with text data comprises populating the sixth one of the first content regions with text data entered by the user of the first mobile platform.

12. The method of claim 10, wherein the user selected video data is a video captured with a camera included in the first mobile platform, and wherein populating the sixth one of the first content regions with text data comprises populating the sixth one of the first content regions with text data entered by the user of the first mobile platform.

13. The method of claim 1, wherein moving each one of the first content regions to the selected coordinate location within the editable communication screen is achieved via touch inputs on a touchscreen from the user.

14. A mobile platform, comprising:
memory adapted to store program code for communicating with a second mobile platform;
a processing unit adapted to access and execute instructions included in the program code, wherein when the instructions are executed by the processing unit, the processing unit directs the mobile platform to:
receive input to edit an editable communication screen on the mobile platform;
receive input to select a number of first content regions to be included in the editable communication screen
receive input to arrange the first content regions within the editable communication screen on the mobile platform by moving each one of the first content regions to a selected coordinate location within the editable communication screen;
receive input to populate each one of the first content regions in the editable communication screen with first communication data selected by a user of the mobile platform, wherein the first communication data includes text data, image data, and video data, wherein the image data includes an image that is combined with another image, using the mobile platform; and
send the editable communication screen from the mobile platform to the second mobile platform as a communication screen, wherein the communication screen includes layout data utilized to arrange each of the first content regions to the selected coordinate location and the first communication data utilized to populate each one of the first content regions to create a communication screen on a display of the second mobile platform appearing substantially identical to a display of the editable communication screen on the first mobile platform such that the display of the second mobile platform includes second content regions populated with second communication data at relative coordinate locations identical to the first content regions populated with the first communication data at the selected coordinate locations of the mobile platform.

15. The mobile platform of claim 14, wherein the instructions to arrange the first content regions in the editable communication screen includes instructions to:
receive input to select a length dimension and a width dimension for each one of the first content regions in the editable communication screen.

16. The mobile platform of claim 15, wherein the layout data further includes the length dimension and the width dimension for each one of the first content regions in the editable communication screen.

17. The mobile platform of claim 14, wherein the instructions to receive input to populate each one of the first content regions in the editable communication screen with the first communication data includes instructions to receive input to populate a first one of the first content regions with image data representative of a user of the mobile platform, wherein the image data is acquired with a camera included in the mobile platform.

18. The mobile platform of claim 14, wherein the instructions to receive input to populate each one of the first content regions in the editable communication screen with the first communication data includes instructions to receive input to populate a second one of the first content regions with text data entered by the user of the mobile platform.

19. The mobile platform of claim 14, wherein the instructions to receive input to populate each one of the first content regions in the editable communication screen with the first communication data comprises:
   populating a third one of the first content regions with user selected image data, wherein the user selected image data is acquired with a camera included in the mobile platform; and
   populating a fourth one of the first content regions with text data associated with the user selected image data used to populate the third one of the first content regions.

20. The mobile platform of claim 14, wherein the instructions to receive input to populate each one of the first content regions in the editable communication screen with the first communication data comprises:
   populating a fifth one of the first content regions with user selected video data, wherein the user selected video data is acquired with a camera included in the mobile platform; and
   populating a sixth one of the first content regions with text data associated with the user selected video data used to populate the fifth one of the first content regions.

* * * * *